United States Patent Office 3,112,302
Patented Nov. 26, 1963

3,112,302
PURIFICATION OF SOLID HIGH-MOLECULAR WEIGHT POLYOLEFINS
Helmut Kolling, Oberhausen-Holten, and Friedrich Rappen, Oberhausen-Sterkrade, Germany, assignors to Ruhrchemie Aktiengesellschaft, Oberhausen-Holten, Germany
No Drawing. Filed June 17, 1959, Ser. No. 820,869
Claims priority, application Germany July 11, 1958
6 Claims. (Cl. 260—94.9)

A known process of purifying high-density olefins obtained by the Ziegler low-pressure process involves the steps of separating part or all of the auxiliary liquid or dispersant used in the polymerization with hydrogen chloride and mixtures of alcohols having a preferred concentration in excess of 95% treating the polymers with water-free and alcohol-free organic liquids, particularly hydrocarbons, at temperatures below about 100° C. and then washing the polymers until neutral and drying them. This process results in finished products having ash contents of 0.01% by weight or less even in the case of polymers which originally are very high in ash. Moreover, this process is applicable with good success in cases where not only the bulk but the total amount of the auxiliary liquid used in the polymerization is separated before the purification. In this manner, the purifying operation is completely separate from the polymerization proper so that these two operational steps will not interfere with each other.

However, in processing the polyolefins purified by this process, corrosion occurs in the molding machines in the course of time, which corrosion, under certain circumstances, may even result in discoloration of the product being processed. This corrosion probably is caused by minute residual amounts of catalyst constituents which form hydrogen chloride and which exert practically no influence on the ash content, but which result in corrosion problems in the equipment during extended periods of processing.

It has been found that high-density polyolefins, particularly polyethylene, obtained by the Ziegler process, having ash contents of not more than 0.01% by weight and causing no corrosion in the processing equipment, even during very long periods of processing, can be produced if the raw polyolefins obtained in the polymerization, after separating therefrom part or all of the auxiliary liquid used in the polymerization, are treated at temperatures below about 100° C. with hydrogen chloride and mixtures consisting of an alcohol having a preferred concentration in excess of 95% and water-free and alcohol-free organic liquids, particularly hydrocarbons, whereafter the polyolefins are washed until neutral and subsequently treated with an alcohol containing small amounts of an alkali hydroxide and are finally dried.

The alcohol containing the alkali hydroxide may be allowed to react directly with the polyolefin previously de-ashed with a mixture of HCl, alcohol and hydrocarbon and washed to neutrality, e.g., after separating the washed polyolefin by filtration from the bulk of the liquid mixture used for de-ashing. However, it is particularly advantageous to remove the total quantity of the liquid mixture used for de-ashing from the previously de-ashed and neutralized product. This may be effected by washing the filter residue on the filter, e.g., a drum filter, with alcohols, preferably water-soluble monohydric alcohols. This results in a polyolefin which contains only alcohol and which is subsequently mixed with the alcohol containing the alkali hydroxide. Alternatively, the residual amount of the de-ashing liquid may be removed by treating the filter residue with inert gases while applying heat. This treatment preferably is carried out in so-called spiral flow driers. Finally, another possibility of removing the residual amounts of the de-ashing liquid is a treatment with steam and subsequent drying.

The final treatment with alcohol is preferably carried out with the use of a water-soluble monohydric alcohol, for example, ethanol or propanol. The content of free alkali hydroxide in the alcohol should range between about 0.001 and 1% and preferably between 0.005 and 0.01%. The treatment may be effected at normal temperatures. However, it is particularly advantageous to use slightly elevated temperatures, e.g., a temperature between 40 and 90° C. The quantity of alcohol used is substantially dependent upon the type of equipment and is generally between two times and ten times the quantity of polyolefin.

When de-ashing with mixtures of HCl, alcohols and preferably hydrocarbons, it is advantageous to use alcohols whose concentration is practically 100%. The quantity of hydrogen chloride added may be very small, and it generally suffices to add less than 1% of hydrogen chloride, based on the liquid mixture used for de-ashing. The liquid mixture usually contains a major amount of hydrocarbon and a smaller amount of alcohol, for example, less than 30%. The de-ashing liquid is returned into the de-ashing cycle after separation from the de-ashed polyolefin and after adjustment to the composition desired.

The polyolefins may be washed to neutrality after de-ashing by various methods. For example, one method involves separation of the de-ashing liquid by filtration and washing the filter residue with alcohols, water or hydrocarbons. A further method of neutralization is a treatment of the reaction mixture with water after de-ashing and prior to filtration. This treatment with water may be effected in batches or may be carried out in continuous operation by a very simple method, by passing the water in countercurrent to the de-ashing liquid. In this water treatment, the dissolved ash constituents and, if a water-soluble alcohol had been used for de-ashing, the alcohol components of the de-ashing liquid are washed out.

Previously, a treatment of low-pressure polyolefins has been suggested wherein the polymers, if desired, after separation of the bulk of the auxiliary liquid used in the polymerization, are contacted with alcohols containing an alkaline medium and are washed with water after this contacting. However, processes of this type result in finished products which, although causing no longer substantial corrosion when processed, have ash contents of 0.1% or substantially more and, hence, are unsuited for many applications, e.g., in the electrochemical field. In contrast to this known process, the process according to the instant invention results in end products having ash contents of 0.01% by weight or less. Moreover, the process according to the invention no longer requires a washing step following the treatment with an alkali hydroxide-containing alcohol.

As mentioned above, an additional advantage exhibited by the process according to the invention over all prior art processes consists in its capability of purifying to ash contents of 0.01% by weight or less even those polymerization products from which virtually 100% of the auxiliary liquid or dispersing agent used in the polymerization had been removed. The dispersant is driven off in the presence of inert gases in so-called spiral flow driers or, alternatively, by a treatment with steam and subsequent drying. This means that the polymerization and purifying operations can be carried out completely separately from each other, thereby eliminating the necessity of costly operations for purifying the auxiliary liquid used for the polymerization, e.g., from the alcohols used for de-ashing which are considerably troublesome in the polymerization.

The instant invention now will be further illustrated

Example 1

Ethylene was polymerized at approximately 80° C., using as a dispersant or auxiliary liquid a hydrogenated and thoroughly dried $C_9$–$C_{11}$ aliphatic hydrocarbon fraction derived from the Fischer-Tropsch synthesis, and in the presence of a catalyst consisting of 1 mol titanium tetrachloride and 1.5 mols diethyl aluminum monochloride. The bulk of the hydrocarbon fraction used as dispersing agent was separated from the reaction product in a cyclone protected from access of air and moisture.

One part of the filter residue comprising about equal parts of polyethylene and solvent was agitated for 2 hours at a temperature of 80° C. with 4.5 parts of a mixture consisting of 80 parts of the $C_9$–$C_{11}$ hydrocarbon fraction used as the dispersant for the ethylene polymerization and 20 parts 99.8% isopropyl alcohol and containing 0.5% of hydrogen chloride. The mixture was then filtered, and the filter residue was washed with water until neutral. One part of the neutralized product containing essentially equal parts polyethylene and solvent was treated for 2 hours at 70° C. with 4 parts 99.8% isopropyl alcohol containing 0.005% by weight dissolved potassium hydroxide. After filtration and drying, a finished product was obtained which had an ash content of 0.007% by weight.

Example 2

Ethylene was polymerized at a temperature of approximately 75° C. with a catalyst consisting of 1 mol titanium tetrachloride and 2 mols triisobutyl aluminum using the same auxiliary liquid as in Example 1. The bulk of the hydrocarbon fraction was separated from the reaction product by filtration. The residual amount of hydrocarbon then was removed by means of a preheated nitrogen current in a drying tube externally heated to about 100° C.

One part of the resultant product was stirred for 2 hours at a temperature of 75° C. with 8 parts of a mixture consisting of 75 parts toluene and 25 parts 96% ethyl alcohol and containing 0.7% hydrogen chloride. The mixture was then filtered, and the filter residue was washed with ethyl alcohol to neutrality. After washing, the filter residue contained approximately equal parts of polyethylene and ethyl alcohol. One part of this residue was treated for 2 hours at 50° C. with 3 parts 96% ethyl alcohol containing 0.007% by weight potassium hydroxide. The end product obtained after filtration and drying had an ash content of 0.008% by weight.

Example 3

Ethylene was polymerized under the conditions described in Example 1 except that a mixture of 1 mol titanium tetrachloride and 2 mols diethyl aluminum monochloride was used as catalyst. The polymerization temperature was approximately 80° C. Again, the bulk of the hydrocarbon fraction was removed from the reaction product by filtration, and the residual amount of solvent then was separated by means of a drying tube in the manner described in Example 2.

One part of the polyethylene powder thus obtained was agitated for 2 hours at a temperature of 75° C. with 10 parts of a mixture consisting of 80 parts toluene and 20 parts 99.8% isopropyl alcohol and containing 0.5% hydrogen chloride. The reaction mixture was then mixed with 0.2 part water and subsequently stirred for 1 hour at room temperature. After separation of the water, the product was filtered, and the filter residue was dried in a drying tube by means of a preheated nitrogen stream.

The polyethylene powder thus obtained was treated for 1 hour at 60° C. with 10 parts 90% isopropyl alcohol containing 0.004% by weight dissolved sodium hydroxide. After filtration and drying, a finished product having an ash content of 0.009% by weight was obtained.

Example 4

Ethylene was polymerized under the conditions described in Example 1 except that a catalyst consisting of 1 mol of titanium tetrachloride and 2 mols of triethyl aluminum was used. The bulk of the hydrocarbon fraction used as the auxiliary liquid for the polymerization was separated from the reaction product in a cyclone protected from access of air and moisture. The filter residue was then freed from the residual solvent by a treatment with steam in a screw conveyor and subsequently dried.

One part of this product was agitated for 2 hours at a temperature of 70° C. with 6 parts of a mixture consisting of 85 parts xylene and 15 parts ethyl alcohol and containing 0.8% of hydrogen chloride. The reaction mixture was then mixed with 0.3 part water and stirred for 1 hour at 20° C. After separation of the water, the product was filtered, and the filter residue freed from the residual de-ashing liquid by means of steam and dried.

One part of the polyethylene powder thus obtained was treated for 2 hours at 70° C. with 5 parts 99.8% isopropyl alcohol containing 0.005% by weight dissolved potassium hydroxide. After filtration and drying, a finished product was obtained which had an ash content of 0.006% by weight.

Example 5

Ethylene was polymerized at 75° C. using the same dispersing agent as in Example 1 and a catalyst consisting of 1 mol of titanium tetrachloride and 1.5 mols of diethyl aluminum monochloride.

The bulk of the hydrocarbon fraction was separated from the reaction product by filtration. The residual amount of the hydrocarbon fraction was removed by means of a drying tube in the manner described in Example 2.

75 g./h. (grams per hour) of the polyethylene powder thus obtained were slurried with 750 cm.³/hr. of a mixture consisting of 95 parts of the $C_9$–$C_{11}$ hydrocarbon fraction used for the ethylene polymerization and 5 parts 99.8% isopropyl alcohol and containing 0.5% of hydrogen chloride. De-ashing and neutralization of the de-ashed polyethylene powder was carried out in two successive glass tubes, each 1.20 meters in length and 52 mm. inside diameter. The first glass tube was heated at 80° C. by an external jacket and was provided with a cylindrical stirrer of 27 mm. outside diameter occupying the total height of the glass tube. Half of the second glass tube was filled with Raschig rings of 8 to 10 mm. diameter. Water in amounts of 150 ml./hr. was introduced into this tube through a dipping tube terminating approximately 10 cm. above the Raschig rings. The water was withdrawn through a trap. The slurried product passed through both tubes in upward direction and then into a suction filter. The filtrate obtained was returned into the slurrying vessel after making up with that amount of de-ashing liquid which was left in the filter residue and that amount of isopropyl alcohol which had been dissolved in the wash water and after adjusting it to a hydrogen chloride content of 0.5%. The filter residue was washed with 90% isopropyl alcohol on the suction filter for removal of the residual amount of de-ashing liquid.

The resultant product which contained approximately equal parts of polyethylene and isopropyl alcohol was treated for 1 hour at 70° C. with 4 parts 90% isopropyl alcohol containing 0.005% by weight of dissolved potassium hydroperoxide. After filtration and drying, a finished product resulted which had an ash content of 0.007% by weight.

We claim as our invention:

1. A process for the purification and lowering of the ash content of polyethylene to 0.006–0.009 percent by weight, said polyethylene having been produced by the polymerization of ethylene at temperatures below 100° C. and at pressures below 100 kg./cm.² with catalysts consisting of mixtures of aluminum alkyl compounds with titanium tetrachloride and in the presence of a substantially aliphatic liquid hydrocarbon as dispersant, which comprises separating the bulk of said dispersant, washing the remaining polyethylene containing ash by agitating the same with a de-ashing mixture of a water-free and alcohol-free hydrocarbon, an alcohol selected from the group consisting of ethanol and isopropanol of at least 95 percent concentration, and hydrogen chloride, said hydrocarbon constituting at least 70 percent of the de-ashing mixture, and said hydrogen chloride constituting 0.5 to 1 percent of the de-ashing mixture, separating the washed polyethylene by filtration, washing the filtered polyethylene to neutrality with a liquid selected from the group consisting of water, alcohols and hydrocarbons, treating the polyethylene with a monohydric water-soluble alcohol containing 0.005 to 1 percent alkali hydroxide at approximately 40–90° C., filtering and drying said polyethylene.

2. The process according to claim 1, wherein all residues of said de-ashing mixture are removed from said polyethylene prior to the treatment with alkali hydroxide-containing alcohols.

3. The process according to claim 2, wherein said residues are removed by washing the polyethylene with a monohydric water-soluble alcohol.

4. The process according to claim 2, wherein said residues of the de-ashing mixture are removed by driving them off in a stream of inert gas in a drier.

5. The process according to claim 2, wherein said residues are removed by a treatment with steam and subsequent drying.

6. The process according to claim 1, wherein the monohydric alcohol containing alkali hydroxide is selected from the group consisting of ethanol and isopropanol.

References Cited in the file of this patent

UNITED STATES PATENTS

| | | |
|---|---|---|
| 2,886,561 | Reynolds et al. | May 12, 1959 |
| 2,905,645 | Anderson et al. | Sept. 22, 1959 |
| 2,921,933 | McKinnis et al. | Jan. 19, 1960 |
| 2,938,021 | Geiser et al. | May 24, 1960 |
| 2,962,488 | Horne | Nov. 29, 1960 |

FOREIGN PATENTS

| | | |
|---|---|---|
| 1,135,146 | France | Dec. 10, 1956 |